Figure 1:
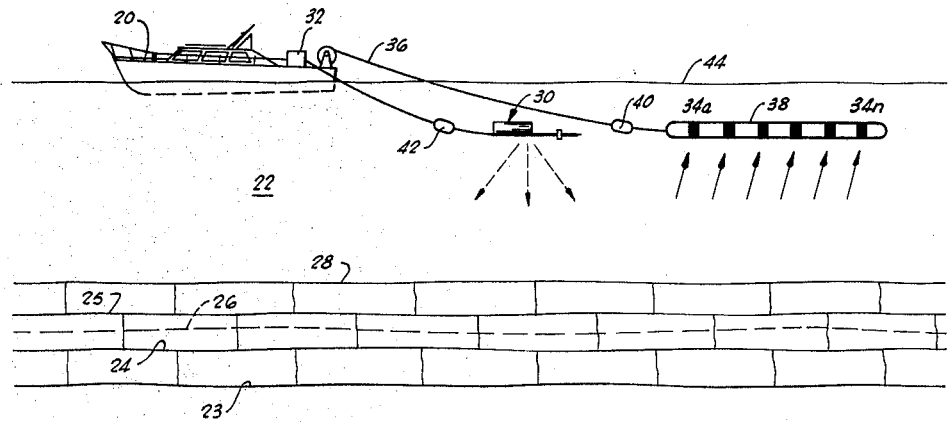

May 10, 1966

W. B. HUCKABAY ETAL 3,251,027

SEISMIC EXPLORATION SYSTEM

Filed Oct. 22, 1962

4 Sheets-Sheet 1

INVENTORS
WILLIAM B. HUCKABAY,
NEIL A. MOORE &
BY  WILLIAM H. PARKER

Dunlap, Laney & Hubbard
ATTORNEYS

INVENTORS
WILLIAM B. HUCKABAY,
NEIL A. MOORE &
BY WILLIAM H. PARKER

ATTORNEYS

May 10, 1966 W. B. HUCKABAY ETAL 3,251,027
SEISMIC EXPLORATION SYSTEM
Filed Oct. 22, 1962 4 Sheets-Sheet 3

INVENTORS
WILLIAM B. HUCKABAY,
NEIL A. MOORE &
BY WILLIAM H. PARKER

ATTORNEYS

May 10, 1966 W. B. HUCKABAY ETAL 3,251,027
SEISMIC EXPLORATION SYSTEM
Filed Oct. 22, 1962 4 Sheets-Sheet 4
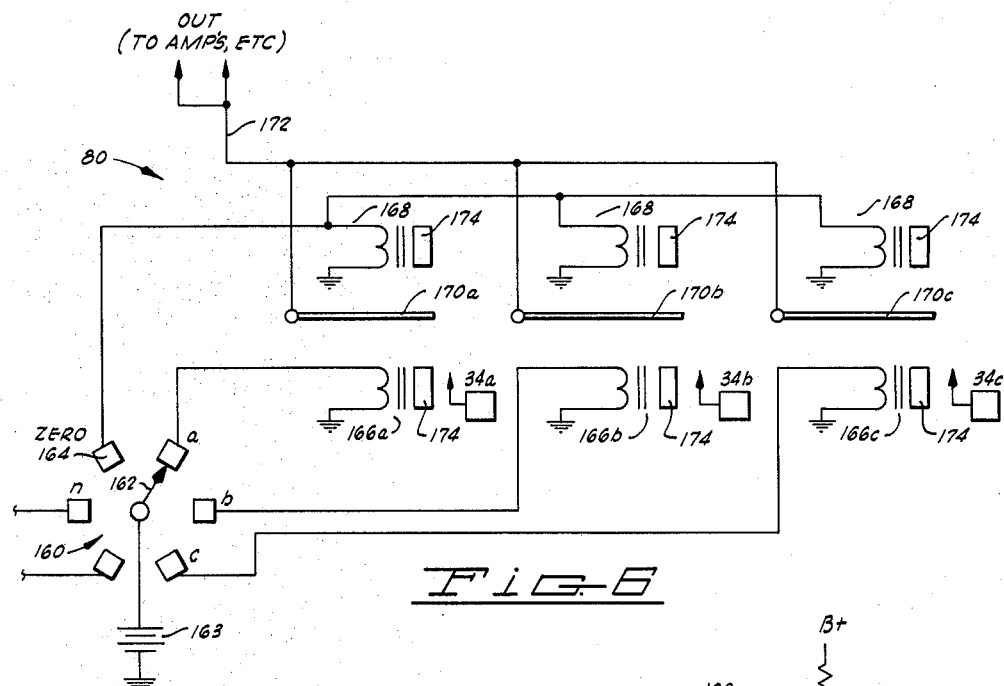
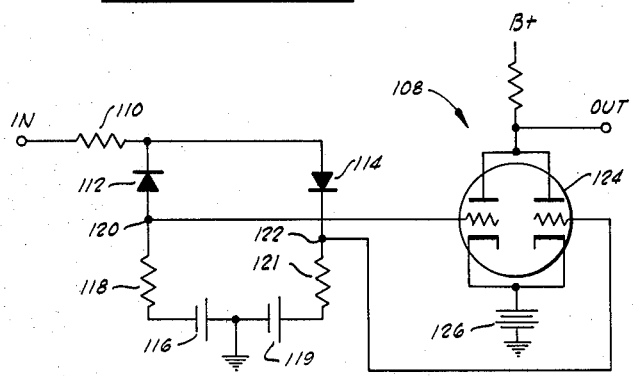
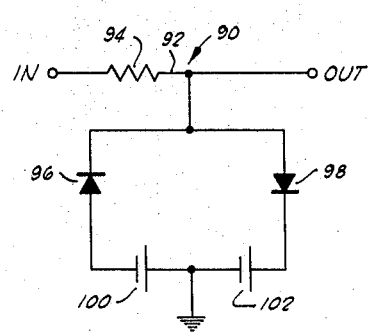
INVENTORS
WILLIAM B. HUCKABAY,
NEIL A. MOORE &
BY WILLIAM H. PARKER
Dunlap, Laney, & Hubbard
ATTORNEYS United States Patent Office 3,251,027
Patented May 10, 1966

3,251,027
SEISMIC EXPLORATION SYSTEM
William B. Huckabay, 4103 Southwestern; Neil A. Moore, 8173 Green Hollow Lane; and William H. Parker, 2402 Springvale, all of Dallas, Tex.
Filed Oct. 22, 1962, Ser. No. 232,202
13 Claims. (Cl. 340—15.5)

This invention relates generally, as indicated, to improvements in the art of seismic exploration. More particularly, but not by way of limitation, the invention relates to an improved source of seismic waves and an improved recording system for reflected seismic waves, both of which are particularly useful in conducting marine seismic surveys in a continuous fashion.

As is well known in the exploration division of the oil industry, seismic surveying or exploration has been carried on for many years. In the conventional seismic survey, the seismic wave source is an explosive charge and the survey is conducted in a discontinuous fashion. That is, the seismic waves are generated at one point, received and recorded, then seismic waves are subsequently generated at a spaced point, received and recorded, normally on a separate record. It is then necessary to reproduce and correlate the information on the various records in order to plot the profiles of the subsurface reflecting horizons, from which the locations of potential oil deposits are determined. Such discontinuous type surveys have been conducted over water-covered areas (known as marine seismic surveying) as well as directly on dry land.

A continuous-type surveying system, which has received enthusiastic support in the oil industry, is disclosed in U.S. Patent 2,994,397. This system is particularly useful in marine surveys and utilizes a gas gun as the seismic wave source. The reflected seismic waves are recorded on a flying spot-type recorder wherein the recording medium is moved in accordance with the distance traveled by the seismic wave source and impressions are made on the recording medium in accordance with the depths of the most efficient or major subsurface reflecting horizons, such that the resulting record provides a profile of these major reflectors. As indicated, the system has received enthusiastic support in the oil industry and has been a major contribution to the art. However, the use of a seismic wave source in the form of a gas gun requires the provision of a continuous source of combustible gas and rather intricate controls for flowing the gas to and through the gas gun. Also, the recording system provides the profiles of only the major reflecting horizons.

In one aspect, the present invention may be considered an improvement of the system disclosed in the above-mentioned patent. The present invention contemplates a novel seismic wave source utilizing a high voltage power supply aboard a vessel and a pair of waterproof, shielded cables extended into the water. The free end of the conductor of one of the shielded cables is exposed in the water and the adjacent portion of the respective conductor is covered only by a thermoplastic material, such that the free end of the above-mentioned conductor forms an electrode. The conductor of the other shielded cable is connected to a large electrode, preferably in the form of a cylinder or tube of conductive material. When a high potential is imposed across the electrodes, an arc occurs in the water in which the electrodes are immersed to generate high energy seismic waves. At the conductor forming one of the electrodes is consumed by repeated usage, the adjacent thermoplastic covering is progressively burned away to expose an additional portion of the electrode to provide an electrode having a long service life.

The present invention also contemplates a novel recording system which provides a record containing the maximum information and which can be readily analyzed.

The signal from each hydrophone or transducer is transmitted through two separate circuits to an electrosensitive recorder. In one circuit, the higher amplitude portions of the signal are selectively amplified and the lower amplitude portions of the signal are eliminated, such that resulting signals transmitted to the recorder indicate only the major subsurface reflecting horizons. These signals are recorded as dark spots or marks by the electrosensitive recorder. In the other circuit, the higher energy portions of the signal are eliminated, such that the resulting signal transmitted to the recorder is a relatively lower amplitude indication of all of the subsurface reflecting horizons and this signal is recorded as lighter or gray-appearing dots or marks on the recording medium. As a result, the final record includes prominent indications of the remaining reflecting horizons to provide ease in analysis. In a preferred embodiment, the recorder is in the form of a flying spot-type recorder, whereby the resulting record contains the profiles of all the major and minor reflecting subsurface horizons, from which the subsurface structure can be immediately observed. Also, in a preferred embodiment, the signals produced by a series of hydrophones or transducers are selectively added to further increase the information contained in the resulting record.

An object of the present invention is to provide a seismic exploration system which obtains and makes available for easy analysis the maximum information regarding the subsurface structure.

Another object of this invention is to provide a continuous-type marine seismic surveying system wherein the profiles of both the major and minor reflecting subsurface horizons will be recorded.

A further object of this invention is to provide a simple seismic wave source for marine surveying which utilizes readily available and conventional apparatus; which may be repeatedly energized for a continuous type of survey, and which will have a long service life and not require frequent retrieval for repair.

A further object of this invention is to provide a seismic recording system wherein the major and minor reflecting subsurface horizons are recorded separately and in a distinctive manner for ease of analysis.

Further objects and advantages of the invention will be evident from the following detailed description when read in conjunction with the accompanying drawings which illustrate the invention.

Figure 2:
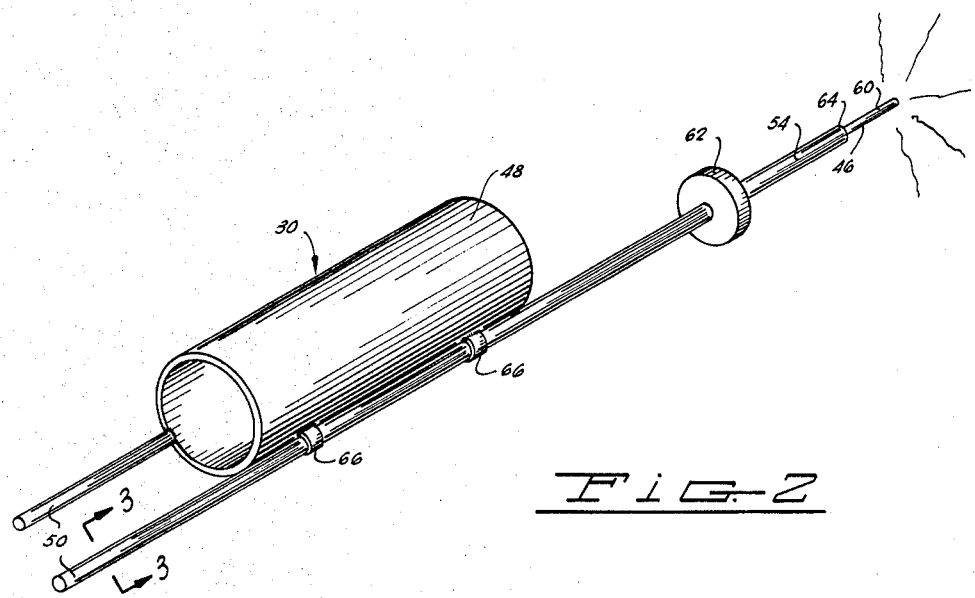
Figure 3:
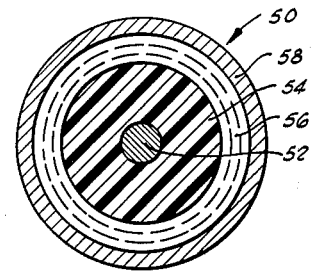
Figure 2A:
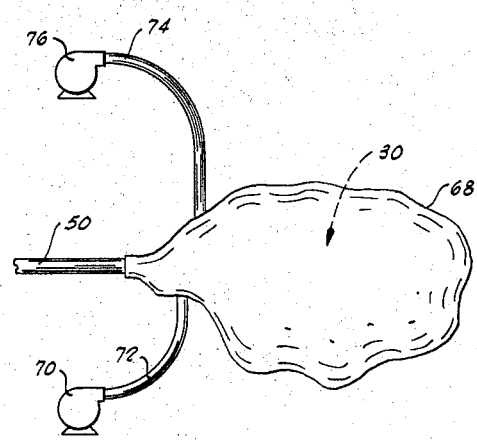
Figure 5:
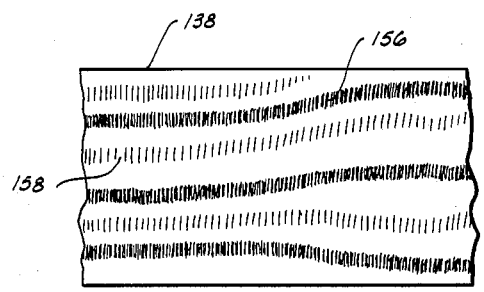
Figure 9:
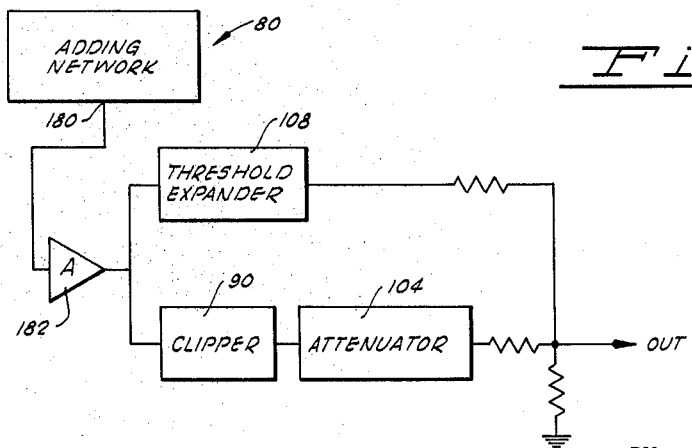
Figure 4:
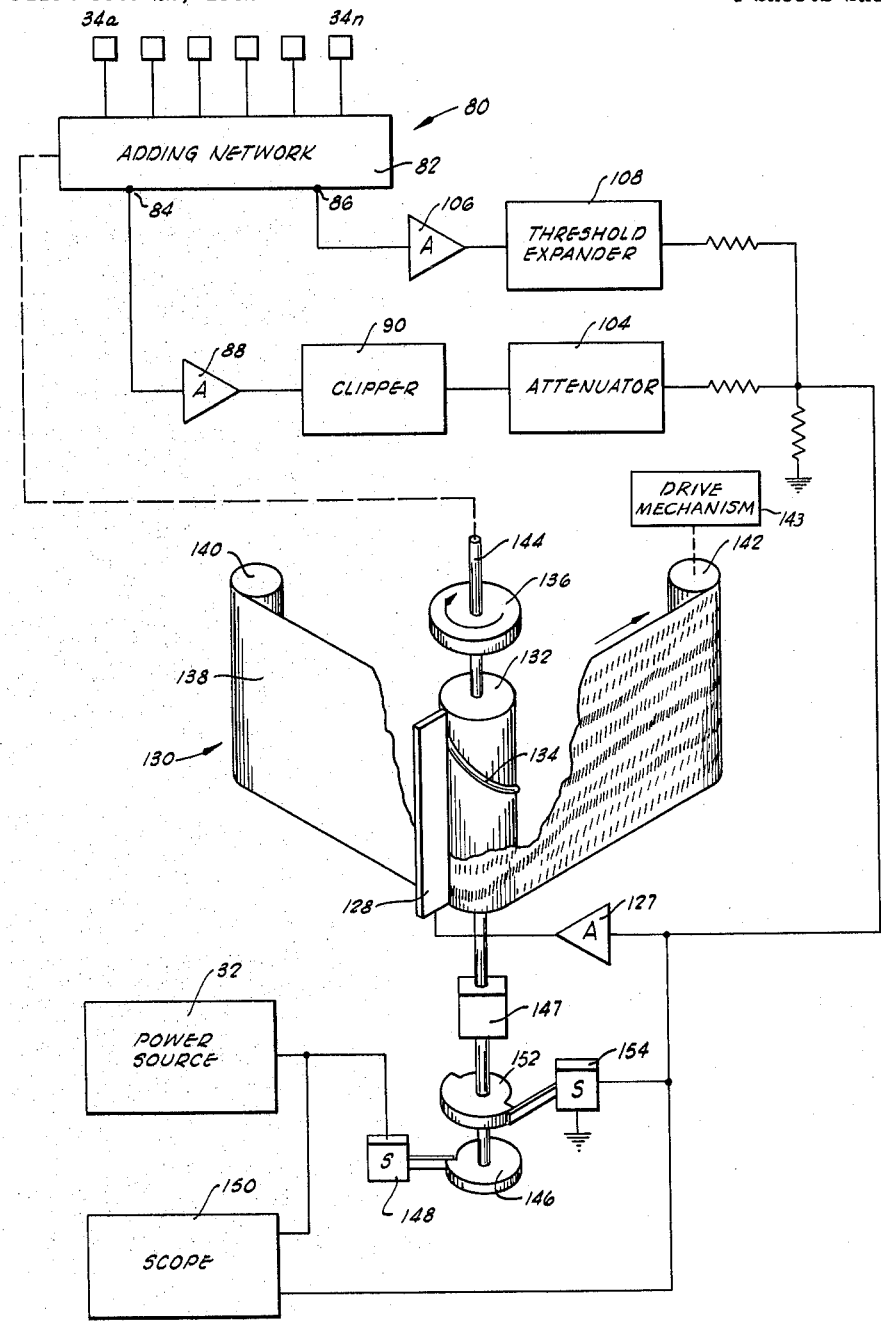

In the drawings:
FIGURE 1 is a schematic view of a water-covered area being surveyed by a system constructed in accordance with this invention.
FIGURE 2 is a perspective view of the electrode system of the seismic wave source.
FIGURE 2A is a schematic view of a modified seismic wave source.
FIGURE 3 is an enlarged cross sectional view of one of the shielded cables utilized in the seismic wave source.
FIGURE 4 is a schematic diagram of the recording system of this invention.
FIGURE 5 is a schematic illustration of a continuous profile record made in accordance with the invention.
FIGURE 6 is a partial wiring diagram of the adding network used in the recording system.
FIGURE 7 is a wiring diagram of the clipper used in the recording system.
FIGURE 8 is a wiring diagram of the threshold expander used in the recording system.
FIGURE 9 is a block diagram of a modified recording system.

Referring to the drawings in detail, and particularly FIG. 1, reference character 20 designates a suitable vessel shown as traversing a predetermined course along a body of water 22, such as an ocean or lake. The subsurface structure below the body of water 22 will normally include a plurality of good seismic wave-reflecting horizons 23, 24 and 25, hereinafter referred to as major reflecting horizons, as well as one or more relatively poor seismic wave-reflecting horizons 26, hereinafter referred to as a minor reflecting horizon. It will be understood that the reflecting horizons 23 through 26 are positioned at various depths, sometimes several thousand feet, below the floor 28 of the body of water 22. The purpose of the present seismic exploration system is to determine the depths and the configuration of the reflecting horizons 23 through 26, and particularly the major reflecting horizons 23, 24 and 25.

In accordance with the present invention, a seismic wave source 30 is connected to a high voltage power supply 32 on the vessel 20 and is towed through the water 22 for repeatedly generating seismic waves as indicated by the dashed arrows extending downwardly from the source 30. The seismic waves are of sufficient amplitude to pentrate the floor 28 and be reflected back upwardly by the various reflecting horizons as indicated by the solid arrows in FIG. 1. The reflected seismic waves are received by a plurality of hydrophones 34a through 34n, hereinafter referred to as transducers. The transducers convert the seismic waves to electrical signals and transmit such electrical signals through suitable conductors (not shown) extending through a towing cable 36 to recording equipment aboard the vessel 20. As will be understood by those skilled in the art, the transducers 34a through 34n are normally positioned in a flexible tube 38 to facilitate the towing of the transducers by the vessel 20. Also, the transducers and the source 30 are maintained at the desired depths in the water 22 by suitable floats 40 and 42.

In a preferred embodiment, the transducers 34a through 34n are towed through the water 22 at a depth equal to a multiple of one-fourth of the wave length of the lowest frequency seismic wave to be detected to provide a cancellation of undesirable and a reinforcement of desirable secondary reflections of the seismic waves from the surface 44 of the body of water. Also, the adjacent transducers are positioned apart a distance equal to one-half of the wave length of the highest frequency of seismic waves of interest and the string of transducers extends over a length at least as great as the wave length of the lowest frequency seismic waves of interest, to provide cancellation of waves traveling horizontally between the source 30 and the transducers. With this arrangement, the transducers have the maximum response to seismic waves reflected by the floor 28 and the subsurface reflecting horizons 23 through 26.

The novel seismic wave source 30 of this invention is shown in FIG. 2 and comprises a small electrode 46 and a large electrode 48. Both of the electrodes 46 and 48 are secured to a pair of shielded cables 50 extending from the high voltage power supply 32 (shown in FIG. 1) to provide high voltage pulse-type potentials between the electrodes, such as pulses of 15,000 volts. Upon the occurrence of each pulse, an arc is formed through the water 22 between the electrodes which suddenly increases the pressure in the water 22 and creates seismic waves. The large electrode 48 is in the form of a tube of electrically conductive material, such as brass, and may be, for example, four inches in diameter and eighteen inches long in a typical commercial embodiment. It will be understood that the electrode 48 is electrically connected to the conductor of one of the shielded cables 50. Each shielded cable 50 (FIG. 3) comprises an electrical conductor 52 having a layer 54 of a thermoplastic material, such as polyethylene, around the conductor. A layer 56 of shielding surrounds the polyethylene 54 and normally comprises a copper braid. The shielding 56 is in turn covered by a layer 58 of a waterproof material, such as neoprene, to protect the shielding and the conductor 52 from the effects of the water 22.

The small electrode 46 is an extension of the conductor 52 of the respective shielded cable 50 to provide an exposed portion 60 at the free end of the conductor. A suitable sealing device 62 is secured around the respective cable 50 some distance from the free end 60 of the respective conductor and the waterproof jacket or layer 58 and the shielding 56 are terminated in the sealing device 62. Thus, the thermoplastic material 54 extends from the sealing device 62 toward the free end 60 of the respective conductor and terminates short of the free end 60. The presence of the thermoplastic material 54 around the conductor from the sealing device 62 to adjacent the free end 60 of the respective conductor 52 prevents electrical communication between the conductor and the surrounding water except at the free end 60 of the conductor. Thus, the free end 60 of the conductor forms the smaller electrode 46. As the electrode 46 is consumed during repeated arcing between the electrodes 46 and 48, the extreme outer end 64 of the thermoplastic material is burned or blown away to progressively expose the conductor 52 and always provide an exposed portion of the conductor to form the small electrode 46. With this arrangement, the seismic wave source 30 can be left in the water 22 and used for an extended period of time before requiring repair. The large electrode 48 will take an extremely long period of time before being consumed through the arcing operation, and the service life of the smaller electrode 46 will depend upon the distance between the free end 60 of the respective conductor 52 and the sealing device 62. It will be observed that the shielded cable 50 having the smaller electrode 46 as an extension thereof is suitably secured to the large electrode 48 by clamps 66 to retain the electrodes 46 and 48 in the desired positions in the water. At the beginning of a surveying operation, the distance between the electrodes 46 and 48 may be, for example, six feet which provides an effective arcing between the electrodes and the creation of a fireball around the small electrode 46 for creation of seismic waves.

The previous description of the seismic wave source 30 has assumed that the electrodes 46 and 48 are immersed in a good electrolyte such as sea water. In the event the source 30 is to be used in fresh water, a large bag 68 (FIG. 2A) of elastic material, such as neoprene, may be secured around the shielded cables 50 to envelope the electrodes 46 and 48. In this embodiment, a suitable electrolyte is pumped into the bag 68 by a pump 70 mounted on the vessel 20 and connected to the bag 68 by a conduit 72. The electrolyte may be of any desired composition, such as about a ten percent by weight salt concentration, to provide an effective arcing between the electrodes 46 and 48. Each time an arc is provided between the electrodes, the bag 68 is rapidly expanded to transmit seismic waves through the respective body of water surrounding the bag in substantially the same manner as described above. The products of combustion created in the bag 68 are removed through a conduit 74 extending from the bag to a suction pump 76 mounted on the vessel 20.

The preferred recording system 80 for use in a profiling type of operation is illustrated in FIG. 4. The system 80 comprises an adding network 82 electrically connected to all of the transducers 34a through 34n for seectively adding the electrical signals produced by the transducers and providing identical composite signals at two separate outputs 84 and 86, as will be described more in detail below. The composite signals appearing at the output terminal 84 of the adding network are transmitted to a seismic amplifier 88 having the desired filters for eliminating unwanted frequencies and having any desired type of gain control. The amplified and filtered composite signal is transmitted from the amplifier 88 to a clipper network 90 which eliminates those portions of the composite signal exceeding a predetermined amplitude, to provide an output signal representing all of the subsurface reflecting horizons giving rise to the reflected seismic waves.

A typical clipper network is shown in FIG. 7 and comprises a main conductor 92 receiving the input signal through a limiting resistor 94. The signals transmitted through the conductor 92 are imposed on two oppositely connected diodes 96 and 98. One of the diodes, 96, has its plate connected to the main conductor 92 and its cathode connected to the negative side of a D.C. source 100, and the other diode 98 has its cathode connected to the main conductor 92 and its plate connected to the positive side of another D.C. source 102. The positive side of the source 100 and the negative side of the source 102 are suitably connected to ground. It will thus be seen that all portions of any signal being transmitted through the main conductor 92 having a negative amplitude exceeding the potential of the source 100 will be drained off through the diode 96 to ground. Also, all portions of any signal being transmitted through the conductor 92 having a positive amplitude greater than the potential of the source 102 will be drained through the diode 98 to ground. Thus, the resulting signal appearing at the output of the clipper 90 will have a maximum negative amplitude equal to the potential of the source 100 and a maximum positive amplitude equal to the potential of the source 102. In the present system, the output signal from the clipper 90 will thus represent all of the subsurface reflecting horizons giving rise to the seismic waves received by the transducers 34a through 34n. Referring again to FIG. 4, it will be observed that the output of the clipper 90 is passed through a suitable attenuator 104 to further limit the amplitude of the clipped signal, if desired.

The composite signals appearing at the output 86 of the adding network 82 are transmitted to a suitable seismic amplifier 106 containing the desired filters and automatic gain controls. The amplified composite signal is then transmitted from the amplifier 106 for a threshold expander 108 wherein those portions of the input signal exceeding a predetermined positive or negative potential are amplified and the remainder of the input signal is eliminated, to provide an output signal representative of the depths of only the major subsurface reflecting horizons 23, 24 and 25 shown in FIG. 1.

A preferred threshold expander 108 is shown in detail in FIG. 8. The signal appearing at the input of the expander 108 is passed through a limiting resistor 110 and imposed upon oppositely connected diodes 112 and 114. The negative portions of the input signal are passed through the diode 112 in opposition to a D.C. source 116 connected to the cathode of the diode through a resistor 118. Thus, the signal appearing at a junction 120 between the diode 112 and the resistor 118 comprises only those negative portions of the input signal which exceed the potential of the source 116. The positive portions of the input signal are passed through the diode 114 in opposition to another D.C. source 119 which is connected to the plate of the diode 114 through a resistor 121. It will thus also be seen that the signal appearing at the junction 122 between the diode 114 and the resistor 121 comprises only those positive portions of the input signal exceeding the potential of the source 119. The negative side of the source 119 and the positive side of the source 116 are suitably connected to ground.

One grid of a double triode amplifier 124 is connected to the junction 120 to receive the negative signals and the other grid of the tube 124 is connected to the junction 122 to receive the positive signals. The cathodes of the tube 124 are biased by a suitable D.C. source 126 having its positive side connected to the cathode. Thus, the output signal from the amplifier 124 will comprise positive and negative pulses representing those portions of the input signal to the expander which exceed predetermined maximum positive and negative potentials, but the output of the amplifier 124 will be of substantially higher amplitude than the input signal to the expander. If desired, it will be understood that only the positive or the negative signals transmitted to the expander may be used, by disconnecting the junction 120 or 122 and connecting the respective grid of the tube 124 to a negative potential.

The outputs of both the attenuator 104 and the threshold expander 108 (FIG. 4) are connected through a suitable power amplifier 127 to the printing blade 128 of an electrosensitive printer 130 preferably of the flying spot type. The printer 130 comprises the usual drum 132 having a conductor rod 134 wound thereon in the form of a helix and with the drum being rotated by a suitable motor 136. The electrosensitive recording paper or medium 138 is moved between the drum 132 and the printing blade 128 from a supply roll 140 to a takeup roll 142. In a profiling type system, the takeup roll 142 is turned by suitable drive mechanism 143 in accordance with the speed of the vessel 20, such that the distance along the length of the recording medium 138 may be correlated to the distance traveled by the vessel 20 during a surveying operation. Also, when the preferred adding network 82 is used, the shaft 144 of the drum motor 136 is connected to the adding network to control the addition of the signals from the transducers 34a through 34n, as will be described in detail below.

A cam 146 is driven by the motor shaft 144 through a 2:1 gear reducer 147 to operate a switch 148 and energize the seismic wave power source 32 every other revolution of the drum 132. Also, the switch 148 is preferably connected to the sweep control of an oscilloscope 150 which is used to monitor the operation of the recorder 130. A two-diameter cam 152 is secured on the drum motor shaft 144 below the gear reducer 147 and operates a switch 154 connecting the attenuator 104 and threshold expander 108 to ground for grounding out this circiut and preventing the transmission of signals to the printing blade 128 every other revolution of the drum 132, as will be described. It will further be observed that the signals from the attenuator 104 and the threshold expander 108 are also applied to the oscilloscope 150.

In analyzing the recording system 80, let it be assumed that the adding network 82 contains a switching mechanism operated by the drum motor shaft 144 for selectively combining the signals produced by the transducers 34a through 34n to provide a sequence of six signals at the outputs 84 and 86 of the adding network. Every other time the helix 134 of the drum 132 is at the upper end of the printing blade 128, the cam 146 operates the switch 148 to energize the seismic wave power source 32 to generate a seismic wave. During further rotation of the drum 132, the helix 134 proceeds downwardly along the printing blade 128 to the lower end of the drum 132. As the helix 134 proceeds downwardly along the blade 128, the first set of composite signals appearing at the outputs 84 and 86 of the adding network are passed and operated on through the respective circiuts in the manner described above. The output signal from the threshold expander 108 will be at a substantially higher amplitude than the output signal from the attenuator 104. As a result, the pulse-type signals transmitted from the threshold expander 108 will provide dark marks or dots on the recording medium 138 and the signals from the attenuator 104 will provide gray or lighter dots or marks on the recording medium 138. As the successive signals appear at the outputs 84 and 86 of the network 82, the signals will be handled in like manner to provide dark and light marks on the recording medium 138 along the width of the recording medium. The signals transmitted from the attenuator 104 and expander 108 are grounded during the next revolution of the drum 132 to eliminate miscellaneous unwanted signals, such as multiple reflections. The duration of one rotation of the drum 132, and hence the time during which reflected seismic signals will be recorded, will be sufficient to include the travel times to the deepest reflecting horizons of interest. For example, each revolution of the drum 132 may take two seconds. The sequence is started again as the helix 134 is again opposite the upper end of the printing blade 128, it being understood that the recording medium 138 is moved past the printing blade 128 during the complete operation.

The resulting record 138 will appear as illustrated in FIG. 5. It will there be seen that dark horizontal rows of marks 156 form the profiles of the major subsurface reflecting horizons 23, 24 and 25 and the lighter rows of marks 158 will represent the profiles of the minor subsurface reflecting horizons. It will be understood that the distance of each dark and light mark from the top of the record 138 will represent the travel time of a seismic wave from the source 30 to the respective subsurface reflecting horizon and back to the transducers, and thus represent the depth of the respective reflecting horizon. The marks on the record 138 provide an immediate indication of the depths of the various reflecting horizons and the variations of the depths of the respective reflecting horizons for immediate analysis by geophysicists. The presence of the lighter marks 158 on the record 138 makes it easier to follow the profiles of the major reflecting horizons represented by the dark marks 156 and present a complete record containing information regarding all of the subsurface reflecting horizons which is highly useful in analyzing the overall subsurface structure.

In a preferred embodiment, the adding network 80 (FIG. 6) comprises a rotary switch 160 having an arm 162 connected to the drum motor shaft 144 and biased by a suitable battery 163. The switch also includes a plurality of circumferentially spaced contacts designated *a* through *n* corresponding with the number of transducers 34*a* through 34*n*, along with a zero contact 164. Each of the stationary contacts is connected to a separate relay coil 166 as illustrated by the connection of the contacts *a*, *b* and *c* to the coils 166*a*, 166*b* and 166*c*. The zero contact 164 is connected to an opposing relay coil 168 for each of the coils 166. Each set of relay coils 166 and 168 are positioned on opposite sides of a relay switch arm 170. The switch arms 170 have been designated 170*a* through 170*c* on the drawing to facilitate an understanding of the system. In the closed position of each of the switch arms 170, it makes contact with the respective transducers 34*a* through 34*n* to transmit the signal from the respective transducer to the output 172 of the network. It will also be observed that suitable permanent magnets 174 are positioned above and below each of the switch arms to retain the respective switch arm open or closed when the switch arm is moved to the respective position by the coils 168 and 166, respectively.

Each time the switch arm 162 engages the zero contact 164 (which may correspond to the firing times of the seismic wave source), all of the coils 168 are energized to open the switch arms 170*a* through 170*n*. The switch arms will then be retained open by the upper permanent magnets 174. As the switch arm 162 moves on in a clockwise direction and engages the switch contact *a*, the coil 166*a* is energized to close the respective switch arm 170*a* and make contact with the transducer 34*a*. The signal generated by the transducer 34*a* will thus be transmitted through the switch arm 170*a* to the output 172 of the network. It will also be noted that the lower permanent magnet 174 will retain the switch arm 170*a* closed until the respective coil 168 is again energized. As the switch arm 162 proceeds and engages the contact *b*, the coil 166*b* is energized to close the switch arm 170*b*; whereupon the signal being generated by the transducer 34*b* will be transmitted through the switch arm 170*b* to join the output from the transducer 34*a* at the output 172 of the network and provide an addition of these two signals. It will thus be seen that the switch 160 progressively connects the transducers to the output 172 until all of the signals from the transducers are being added together and imposed on the output 172.

It will be understood by those skilled in the art that the movement of the switch arm 162 is correlated with the travel time of seismic waves from the source 30 to the reflecting horizons and back to the transducers 34*a* through 34*n*. Thus, the number of transducers used to receive the reflected seismic waves increases with the depth of the various reflecting horizons. In other words, the seismic waves reflected from the shallow reflecting horizons are (in effect) received only by the transducer 34*a* and the seismic waves reflected from the deepest reflecting horizons being investigated are (in effect) received by all of the transducers to provide the maximum sensitivity in the detection of the deeper reflecting horizons.

A modified embodiment of the recording system is shown in FIG. 9. In this embodiment, the adding network 80 has a single output terminal 180 connected to a single seismic amplifier 182 containing the desired filters and gain control. The output of the amplifier 182 is fed through two separate circuits comprising the clipper 90 and attenuator 104 in one circuit and the threshold expander 108 in the other circuit. The clipper 90 and attenuator 104 provide an output signal representing the depths of all of the reflecting horizons and the output of the threshold expander 108 represents the depths of only the major reflecting horizons in the same manner as previously described in connection with FIG. 4. The outputs of the attenuator 104 and the threshold expander 108 are combined and fed to a suitable electrosensitive printer to provide a final record containing dark marks indicating the depths of the major reflecting horizons and light marks representing the depths of the minor reflecting horizons in the same manner as previously described in connection with FIG. 4. The system shown in FIG. 9 is substantially more economical than the system shown in FIG. 4 but is less sensitive, since a single seismic amplifier 182 must be used for both the high amplitude and lower amplitude portions of the composite signal appearing at the adding network output 180.

From the foregoing it will be apparent that the present invention provides a seismic exploration system which may produce a final record containing the maximum information regarding subsurface structure wherein the major subsurface reflecting horizons are more easily studied. When the system is used for profiling, as in a continuous-type seismic survey, the major reflecting horizons will be recorded as dark lines on the final record which can be easily followed by the user of the system. It will also be apparent that the present invention provides a novel seismic wave source which utilizes commonly available materials and equipment and will have a long service life without the requirement for frequent retrieval and repair.

Changes may be made in the combination and arrangement of parts or elements as heretofore set forth in the specification and shown in the drawings, it being understood that changes may be made in the embodiments disclosed without departing from the spirit and scope of the invention as defined in the following claims.

We claim:
1. A source of seismic waves for use in a water-covered area wherein the water is a poor electrolyte, comprising:
   a flexible bag of waterproof material immersed in the water;
   a conductor in the bag having a first end and a second end;
   a layer of thermoplastic material around the conductor from said first end to adjacent said second end, whereby the exposed second end portion of the conductor forms a first electrode in the bag;
   a second electrode in the bag substantially larger than the first electrode;

means for supporting the second electrode in the bag in spaced relation from the first electrode;

means for circulating an electrolyte through the bag around and between the electrodes; and means for imposing time-spaced, high voltage pulses across the electrodes to produce arcing in the electrolyte around the first electrode and generate time-spaced seismic waves in the electrolyte which are transmitted through the bag to the water of the water-covered area, whereby said thermoplastic material is progressively burned off to continuously expose the second end portion of the conductor as the second end portion of the conductor is consumed through production of the arcing.

2. A source of seimic waves as defined in claim 1 wherein said electrolyte comprises a ten per cent by weight salt solution.

3. A system for recording seismic signals representing both major and minor subsurface reflecting horizons detected by a transducer which converts the seismic signals to electrical signals, comprising:

an electrosensitive printer;

a threshold expander connected to the printer and the transducers for eliminating those portions of each signal fed thereto below a predetermined amplitude and amplifying those portions of the respective signal exceeding a predetermined amplitude to transmit a pulse-type signal to the printer representative of major subsurface reflecting horizons;

a clipper connected to the printer and the transducer for eliminating those portions of each signal fed thereto exceeding a predetermined amplitude and transmitting a resulting signal to the printer representative of minor subsurface reflecting horizons having an amplitude less than the amplitude of the signals representing major subsurface reflecting horizons, whereby the major subsurface reflecting horizons are printed by the printer darker than the minor subsurface reflecting horizons.

4. A system for recording seismic signals representing both major and minor subsurface reflecting horizons detected by a plurality of transducers which convert the seismic signals to electrical signals, comprising:

an electrosensitive printer;

an adding network connected to the transducers for selectively adding the transducer electrical signals and producing composite signals;

a threshold expander connected to the adding network for eliminating those portions of the composite signals below a predetermined amplitude and amplifying those portions of the composite signals exceeding a predetermined amplitude to produce signals representative of the depths of the major subsurface reflecting horizons;

a clipper connected to the adding network for eliminating those portions of the composite signals exceeding a predetermined amplitude and producing a signal representative of the depths of all reflecting horizons; and conductors connecting both the threshold expander and the clipper to the electrosensitive printer, whereby the printer prints the major reflecting horizons darker than the minor reflecting horizons.

5. A system for recording seismic signals as defined in claim 4 wherein said electrosensitive printer is a flying spot recorder having a rotating drum and a printing blade cooperating with the drum;

said conductors being connected to the recorder printing blade to produce a record illustrating the profiles of the major and minor subsurface reflecting horizons.

6. A system for recording seismic signals as defined in claim 5 wherein said adding network includes switching means connected to the recorder drum and having contacts connected to the transducers for progressively adding the signals from the transducers during each revolution of the recorder drum.

7. A continuous marine seismic exploration system for use with a vessel traversing a course over a water-covered area having both major and minor subsurface reflecting horizons, comprising:

a seismic wave source adapted to be moved through the water with the vessel;

means for periodically energizing said source for transmitting seismic waves down through the water to be reflected by the subsurface horizons;

a plurality of transducers adapted to be moved through the water with the vessel for receiving the reflected seismic waves and producing electrical signals representative of the depths of all the reflecting horizons;

means connected to at least one of the transducers for producing an amplified signal representative of the depths of only the major reflecting horizons;

means connected to at least one of the transducers for producing a smaller amplitude signal representative of the depths of all the reflecting horizons;

an electrosensitive recording medium;

a flying spot recorder drum;

means for moving the recording medium past the drum in accordance with the speed of the vessel;

means for turning the drum one revolution each time the seismic wave source is energized;

a printing blade cooperating with the drum for making a recording on the recording medium; and means connecting the amplified signal and smaller amplitude signal-producing means to the recorder printing blade, whereby the profiles of the reflecting horizons are recorded on the recording medium, with the record of the major reflecting horizons being darker than the minor reflecting horizons.

8. A continuous marine seismic exploration system as defined in claim 7 wherein the seismic wave source comprises a conductor having a first end and a second end:

a layer of thermoplastic material around the conductor from said first end to adjacent said second end to form a first electrode with said second end, a second electrode in the form of a tubular-shaped conductive material, means for supporting the electrodes in the water in spaced relation and imposing high voltage pulses across the electrodes for the formation of arcs in the water around the first electrode, and waterproof shielded cables connected to the electrodes for connecting the electrodes to the vessel.

9. A continuous marine seismic exploration system as defined in claim 7 wherein said means connected to at least one of the transducers for producing an amplified signal representative of the depths of only the major reflecting horizons comprises means for eliminating those portions of each signal fed thereto below a predetermined amplitude, and means for amplifying those portions of each signal fed thereto exceeding a predetermined amplitude.

10. A continuous marine seismic exploration system as defined in claim 7 wherein said means for producing a smaller amplitude signal representative of the depths of all the reflecting horizons comprises a clipper for eliminating those portions of each signal fed thereto exceeding a predetermined amplitude.

11. A continuous marine seismic exploration system as defined in claim 7 characterized further to include:

an adding network connecting said means for producing an amplified signal and said means for producing a smaller amplitude signal to all of the transducers for selectively adding the transducer signals and transmitting composite signals to said means for producing an amplified signal and said means for producing a smaller amplified signal.

12. A continuous marine seismic exploration system as defined in claim 11 characterized further to include:
a pair of amplifying and filtering devices; and
wherein said adding network has two output terminals and said means for producing an amplified signal and said means for producing a smaller amplitude signal are connected to separate output terminals through separate amplifying and filtering devices.

13. A continuous marine seismic exploration system as defined in claim 11 wherein said adding network includes:
a switch having an arm and a plurality of contacts,
relay means connecting each of said contacts to the transducers for progressively adding the signals produced by the transducers as the switch arm engages successive contacts, and
means connecting the switch arm to the flying spot recorder drum for moving the switch arm around all of said contacts during each revolution of said drum.

References Cited by the Examiner

Deep Sea Research, vol. 9, July/October 1962, pp. 339–348. Pergamon Press Ltd.

BENJAMIN A. BORCHELT, *Primary Examiner.*

CHESTER L. JUSTUS, *Examiner.*

T. H. TUBBESING, P. A. SHANLEY,
*Assistant Examiners.*